United States Patent
Ziolkowski et al.

(10) Patent No.: US 11,306,664 B2
(45) Date of Patent: Apr. 19, 2022

(54) SYSTEM AND METHOD TO PREVENT UNINTENDED AIRCRAFT ENGINE SHUTDOWN

(71) Applicant: Gulfstream Aerospace Corporation, Savannah, GA (US)

(72) Inventors: Craig Ziolkowski, Savannah, GA (US); Desmond Ruhan, Savannah, GA (US); Todd Abler, Savannah, GA (US); Andrew Martin, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 179 days.

(21) Appl. No.: 16/845,999

(22) Filed: Apr. 10, 2020

(65) Prior Publication Data
US 2021/0317790 A1 Oct. 14, 2021

(51) Int. Cl.
*F02C 9/32* (2006.01)
*B64D 31/04* (2006.01)
*B64D 45/00* (2006.01)
*F02C 9/46* (2006.01)
*F02C 9/28* (2006.01)

(52) U.S. Cl.
CPC .............. *F02C 9/32* (2013.01); *B64D 31/04* (2013.01); *B64D 45/00* (2013.01); *F02C 9/285* (2013.01); *F02C 9/46* (2013.01); *F05D 2220/323* (2013.01)

(58) Field of Classification Search
CPC ... F02C 9/32; F02C 9/46; F02C 9/285; B64D 31/00; B64D 31/04; B64D 31/06
See application file for complete search history.

(56) References Cited

U.S. PATENT DOCUMENTS

| | | | | |
|---|---|---|---|---|
| 2,591,602 A | * | 4/1952 | Pilcher | B64D 31/04 137/637.1 |
| 2,938,683 A | * | 5/1960 | Morrison | F02K 1/76 244/81 |
| 3,421,317 A | * | 1/1969 | Bedford | H02P 23/16 60/39.281 |
| 3,648,033 A | * | 3/1972 | Bader | F02C 9/32 701/100 |
| 3,691,759 A | * | 9/1972 | Scheerer | F02C 7/26 60/39.091 |
| 4,429,528 A | * | 2/1984 | Matthews | F02C 9/46 60/39.281 |

(Continued)

FOREIGN PATENT DOCUMENTS

GB 783880 A 10/1957

OTHER PUBLICATIONS

Anonymous, Takeoff Configuration Warning 1-15 Systems (TOCWS), SKYbrary Aviation Safety, Date unknown.

*Primary Examiner* — Alain Chau
(74) *Attorney, Agent, or Firm* — LKGlobal | Lorenz & Kopf, LLP

(57) ABSTRACT

Flight control systems, flight control methods, and aircraft are provided. An aircraft including a system and a method for receiving, via a fuel switch, a first control signal indicative of an off position on a fuel switch, determining a throttle resolver angle of a throttle controller in response to the first control signal, comparing the throttle resolver angle to a threshold throttle angle, and generating a pilot warning in response to the first control signal and the throttle resolver angle exceeding the threshold throttle angle.

19 Claims, 5 Drawing Sheets

(56) References Cited

U.S. PATENT DOCUMENTS

| | | | | |
|---|---|---|---|---|
| 4,854,283 A * | 8/1989 | Kiyono | ............... | F02D 11/107 |
| | | | | 123/361 |
| 5,146,892 A * | 9/1992 | Krampe | ............... | F02D 41/22 |
| | | | | 123/198 D |
| 5,285,634 A * | 2/1994 | Hoff | ............... | F02C 9/28 |
| | | | | 60/39.281 |
| 7,347,050 B2 * | 3/2008 | Gainford | ............... | F02C 7/22 |
| | | | | 123/198 D |
| 7,856,295 B2 * | 12/2010 | Zaccaria | ............... | F02C 9/56 |
| | | | | 701/9 |
| 9,799,151 B2 * | 10/2017 | Olson | ............... | F01D 21/14 |
| 10,106,269 B1 * | 10/2018 | Thornton | ............... | B64D 45/00 |
| 10,676,209 B1 * | 6/2020 | Pezalla | ............... | B64D 45/00 |
| 2004/0088085 A1 * | 5/2004 | Nobre | ............... | B64D 31/06 |
| | | | | 701/3 |
| 2005/0268972 A1 * | 12/2005 | Gainford | ............... | F02C 9/26 |
| | | | | 137/601.14 |
| 2009/0240386 A1 * | 9/2009 | Zaccaria | ............... | F02C 9/285 |
| | | | | 701/9 |
| 2014/0360255 A1 * | 12/2014 | Javelot | ............... | G01M 15/042 |
| | | | | 73/114.38 |
| 2016/0318620 A1 * | 11/2016 | Olson | ............... | B64D 31/06 |
| 2017/0129618 A1 * | 5/2017 | Shi | ............... | B64D 31/00 |
| 2017/0249852 A1 * | 8/2017 | Haskins | ............... | G01S 19/15 |
| 2019/0031360 A1 * | 1/2019 | Ettorre | ............... | B64D 27/10 |
| 2021/0173425 A1 * | 6/2021 | Hunter | ............... | G05G 13/00 |

* cited by examiner

SYSTEM AND METHOD TO PREVENT UNINTENDED AIRCRAFT ENGINE SHUTDOWN

TECHNICAL FIELD

The technical field relates generally to propulsion systems for aircraft, and more particularly relates to aircraft propulsion, aircraft avionics systems, propulsion and avionics algorithms, and aircraft equipped with electrically powered systems to override fuel shutoff controls when the aircraft engine is operating above a threshold power level.

BACKGROUND

Aircraft propulsions systems are typically outfitted with a fuel shutoff switch that controls a fuel high-pressure shutoff valve (HPSOV) for each turbine engine. Inadvertent actuation of a fuel shutoff switch will result in a cutoff of fuel to the engine and an immediate loss of engine thrust. Currently, to counter this problem, aircraft are required to perform a high-powered quick engine restart in order to relight the engine after fuel shutoff. If an aircraft is travelling at low speed, high weight, and/or high engine power, the engine may not be able to be restarted before significant altitude is lost. Cycling the switch from run to off to run may require too much time to relight the engine.

The HPSOV is operative to cut off fuel flow to the respective turbine engine in response to the fuel cutoff switch. Currently, there is no two step safeguard in place to prevent an aircrew member from negligently actuating the fuel control switch while the engine is operating at high power. This can result in shutting the engine down during flight operations. An aircraft at heavy weight, slow airspeed, and low altitude (e.g., shortly after takeoff) may have difficulty restarting an engine in a timely manner. As such, it is desirable to provide propulsion control systems, propulsion control algorithms, and aircraft that provide convenient and improved prevention for unintentional fuel cutoff occurrences. In addition, other desirable features and characteristics will become apparent from the subsequent summary and detailed description, and the appended claims, taken in conjunction with the accompanying drawings and this background.

The above information disclosed in this background section is only for enhancement of understanding of the background of the invention and therefore it may contain information that does not form the prior art that is already known in this country to a person of ordinary skill in the art.

SUMMARY

Disclosed herein are propulsion control systems, propulsion control algorithms, related control logic for provisioning aircraft, methods for making and methods for operating such systems, and other vehicles equipped with onboard control systems. By way of example, and not limitation, there is presented a system and method to prevent unintended aircraft engine shutdown.

In a first non-limiting embodiment, a propulsion control system may include, but is not limited to, an aircraft including a throttle having a throttle position, a fuel switch having an on position and an off position, a fuel cutoff valve operative to cut off a fuel supply in response to a fuel cutoff control signal, a combustion turbine engine having a fuel supply provided through the fuel cutoff valve and having a fuel supply rate proportional to the throttle position, and a processor operative to generate the fuel cutoff control signal in response to the fuel switch being in the off position and the throttle position being less than a throttle position threshold, with the processor being further operative to generate a warning signal and inhibit the fuel cutoff control signal in response to the throttle position exceeding the throttle position threshold and the fuel switch being in the off position.

In accordance with another aspect of the present disclosure, a method for receiving, via a fuel switch, a first control signal indicative of an off position on a fuel switch, determining a throttle setting of a throttle controller in response to the first control signal, comparing the throttle setting to a threshold throttle value, and generating a pilot warning in response to the first control signal and the throttle setting exceeding the threshold throttle value.

In accordance with another aspect of the present disclosure, an aircraft including a combustion turbine engine, a fuel tank, a fuel high pressure shutoff valve, a fuel pump for coupling a fuel supply from the fuel tank to the combustion turbine engine via the fuel high pressure shutoff valve, a throttle controller having a throttle resolver angle proportional to an angular displacement of a throttle handle, a fuel switch for generating a first control signal indicative of the fuel switch being in an on position, and a processor configured to receive the first control signal and the throttle resolver angle and to generate a warning signal in response to the throttle resolver angle exceeding a threshold throttle angle, the processor being further operative to maintain the fuel supply to the combustion turbine engine in response to the first control signal and the throttle resolver angle exceeding the threshold throttle angle.

The above advantage and other advantages and features of the present disclosure will be apparent from the following detailed description of the preferred embodiments when taken in connection with the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the disclosure, and such exemplifications are not to be construed as limiting the scope of the disclosure in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of avionic propulsion control systems, avionic propulsion control algorithms, and aircraft fueling systems, aircraft fuel control systems and aircraft are provided. In general, the disclosure herein describes a method and apparatus for preventing the unintentional engagement of a fuel high pressure shut off valve in a fuel supply system of an aircraft engine during operation of the engine. Specifically, the exemplary system provides electronic logic circuitry which overrides an HPSOV engagement command while the thrust lever is at a power setting or angular deflection greater than a threshold amount indicative of an engine operating above an idle speed.

Figure 1:
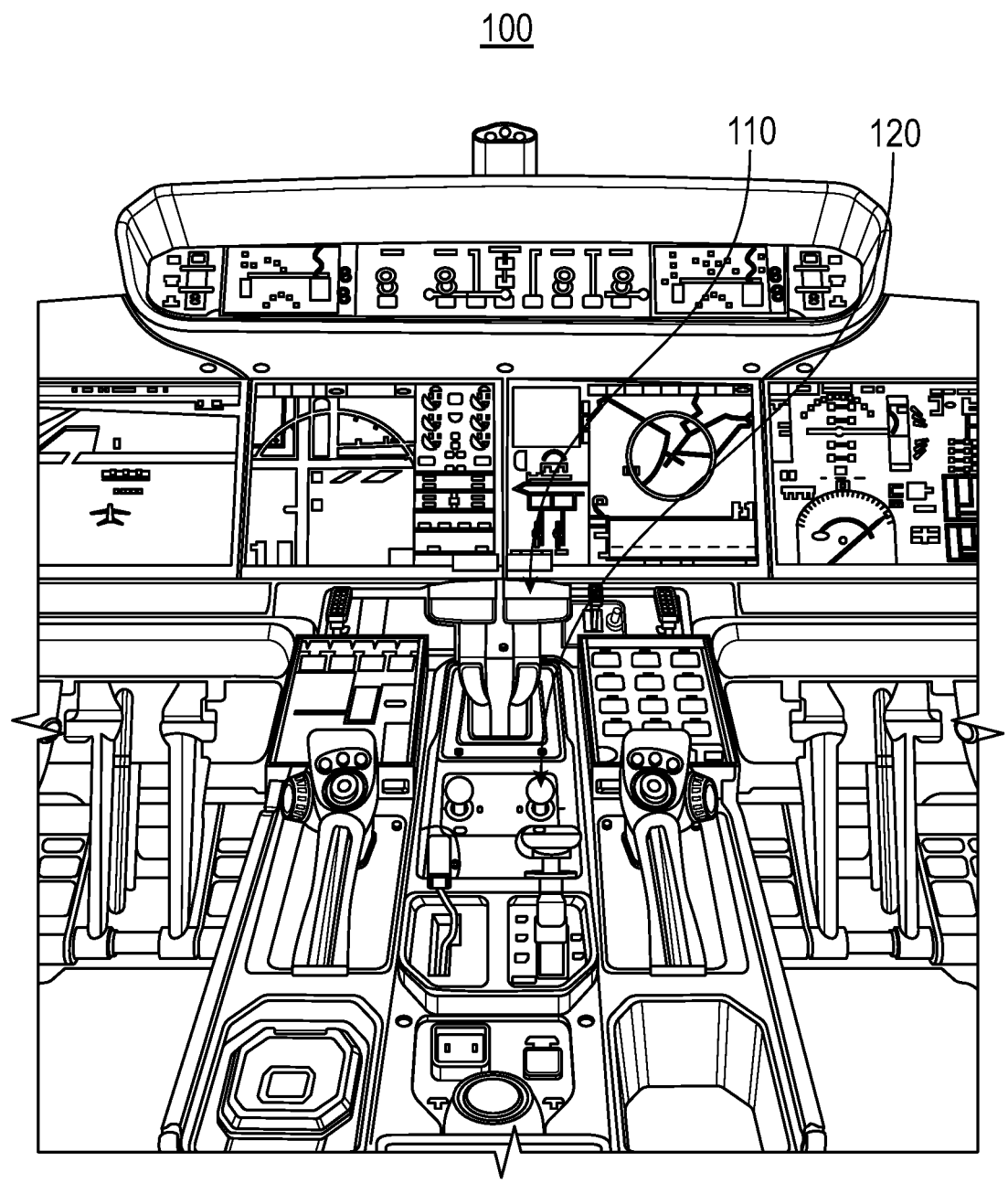
FIG. 1 is illustrative of an exemplary view of a fuel shutoff switch and thrust lever arrangement in an aircraft cockpit in accordance with the teachings of the present disclosure.

Turning now to FIG. 1, a cockpit view 100 is shown illustrative of thrust levers 110 and fuel cutoff switches 120 in an exemplary aircraft in accordance with an embodiment of the present disclosure. The exemplary aircraft has the thrust levers 110 located on a cockpit center console with the fuel control switches 120 located just below the thrust levers 110 on the center console. The currently proposed solution addresses the need to quickly relight the engine in flight if an operating engine is unintentionally shutdown by preventing the unintentional shutdown. An exemplary embodiment of the solution is operative for incorporating an algorithm into the electronic engine controller that will override a fuel shutoff signal from the fuel control switch anytime that the engine is operating at any power setting above idle. In other embodiments, a higher or lower engine operating condition may be set as the operating threshold.

Figure 2:
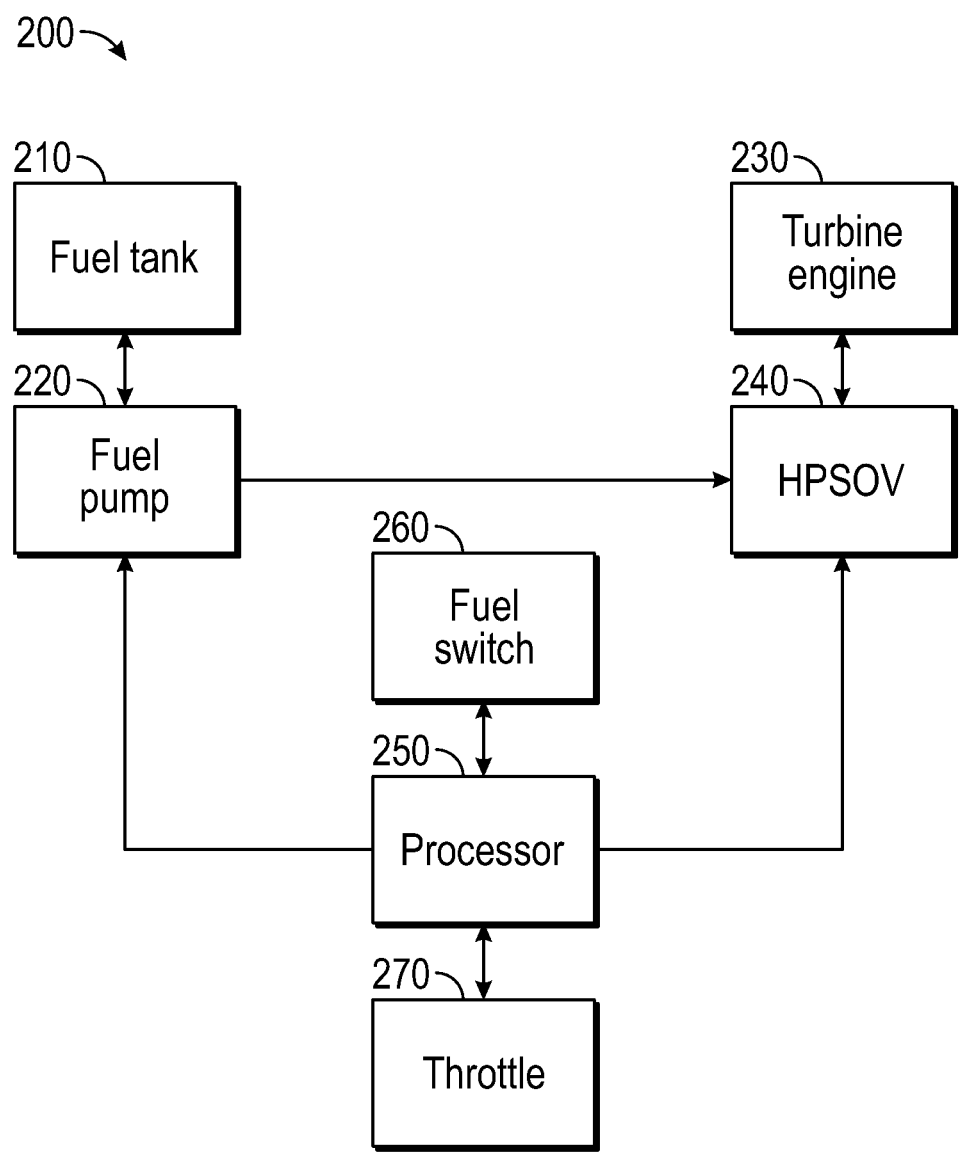
FIG. 2 is a simplified block diagram illustrating a non-limiting embodiment of a system for prevention of unintended aircraft engine shutdown in accordance with the present disclosure.

Turning now to FIG. 2, a block diagram illustrative of an exemplary aircraft system 200 for prevention of unintended aircraft engine shutdown is shown. The exemplary aircraft system 200 includes a fuel tank 210, a fuel pump 220, a turbine engine 230, an HPSOV 240, a processor 250, a fuel switch 260 and a throttle 270.

The exemplary aircraft system 200 may include a turbine engine 230 used as a primary propulsion source for the aircraft. The turbine engine 230 may be a rotary, gas powered, engine that typically comprises an air intake followed by an air compressor. The compressed air is then fed to one or more combustion chambers where it is combusted and then passed over one or more turbines. After passing over the turbine, the combusted air is directed into a nozzle which accelerates the flow and then exhausts it into the free stream to generate thrust. Alternatively, the turbine engine 230 may be replaced with a ram compression or non-continuous combustion engine, such as a pulsejet, motor jet or pulse detonation engine. While the exemplary system described with a single turbine engine 230, the aircraft may be equipped with multiple turbine engines as a design may require and still employ the aspects of the claimed embodiments. In an exemplary embodiment, the turbine engine 230 may include an electric generator, such as a constant speed drive (CSD) electrical generator, used to power electronic systems on the aircraft and/or recharge an electric battery.

The turbine engine 230 is provided a fuel supply stored in a fuel tank 210. The fuel tank may be located in a wing of the aircraft or in the fuselage of the aircraft. Fuel from the fuel tank 210 is pumped to the turbine engine 230 by a fuel pump 220. The fuel pump 210 may be a single fuel pump, or a low-pressure pump located near the fuel tank 210 and a high-pressure pump located near the turbine engine 230. Using a low-pressure fuel pump and a high-pressure fuel pump allows fuel to be supplied via low pressure fuel lines from the fuel tank 210 to the high pressure pump located proximate to the turbine engine 230.

The exemplary system further includes a HPSOV 240 for shutting off a fuel supply to the turbine engine and may be operative for completely shutting off a fuel supply to the combustion chamber of the turbine engine 230. In one exemplary embodiment, the HPSOV 240 is located between the turbine engine 230 and a high-pressure fuel pump 210. The HPSOV 240 may be part of a hydro-mechanical unit and may be controlled by a fuel metering valve as part of an operational turbine engine fueling operation. In this exemplary embodiment, the HPSOV 240 is controlled by a processor 250.

The processor 250 is operative to receive signals from a fuel switch 260 and a throttle 270 as well as other signals from other aircraft systems and sensors. The fuel switch 260 may be a binary position switch indicative of an on or off state. The throttle 270 may a lever located in a center console of an aircraft cockpit. The throttle 270 may be operative to output a value representative of an angular displacement of a throttle handle. For example, the throttle 270 may output a value representative of a two-degree angular displacement of the throttle handle. In an exemplary embodiment, the processor 250 is operative to prevent the HPSOV from shutting off a fuel supply to the turbine engine when the throttle exceeds a threshold amount indicative of an operating turbine engine 230. If the throttle is in an off position, or less than the threshold amount, the processor 250 is then operative to generate a control signal to shut the HPSOV 240 to prevent fuel flow to the turbine engine 230.

In an exemplary embodiment, the processor 250 is operative to receive a signal from the throttle 270 indicative of a throttle setting, such as an angular displacement of the throttle handle. The processor 250 is then operative to generate a control signal in order to supply fuel from the fuel tank 210 to the turbine engine 230 at a fuel rate corresponding to the throttle setting. The processor 250 is then operative to receive a signal from the fuel switch 260 indicative of a pilot request to stop a fuel supply through the HPSOV 240. The processor is then operative to check the throttle setting, or the signal representative thereof, to determine if the throttle setting exceeds a threshold value. In one exemplary embodiment, the threshold value may be two degrees of angular displacement of the throttle handle. If the threshold is not exceeded, indicative that the turbine engine 230 is not under load or that the throttle has been retarded, the processor is operative to generate a control signal to shut the HPSOV 240 to prevent fuel flow to the turbine engine 230. If the threshold is exceeded, the processor 250 may be operative to generate a user warning that the engine is operational and not to close the HPSOV 240. In this example, in order to shut the HPSOV 240 the pilot would need to position the throttle handle below the threshold value and the cycle the fuel switch 260 in order to regenerate the request to close the HPSOV 240.

Figure 3:
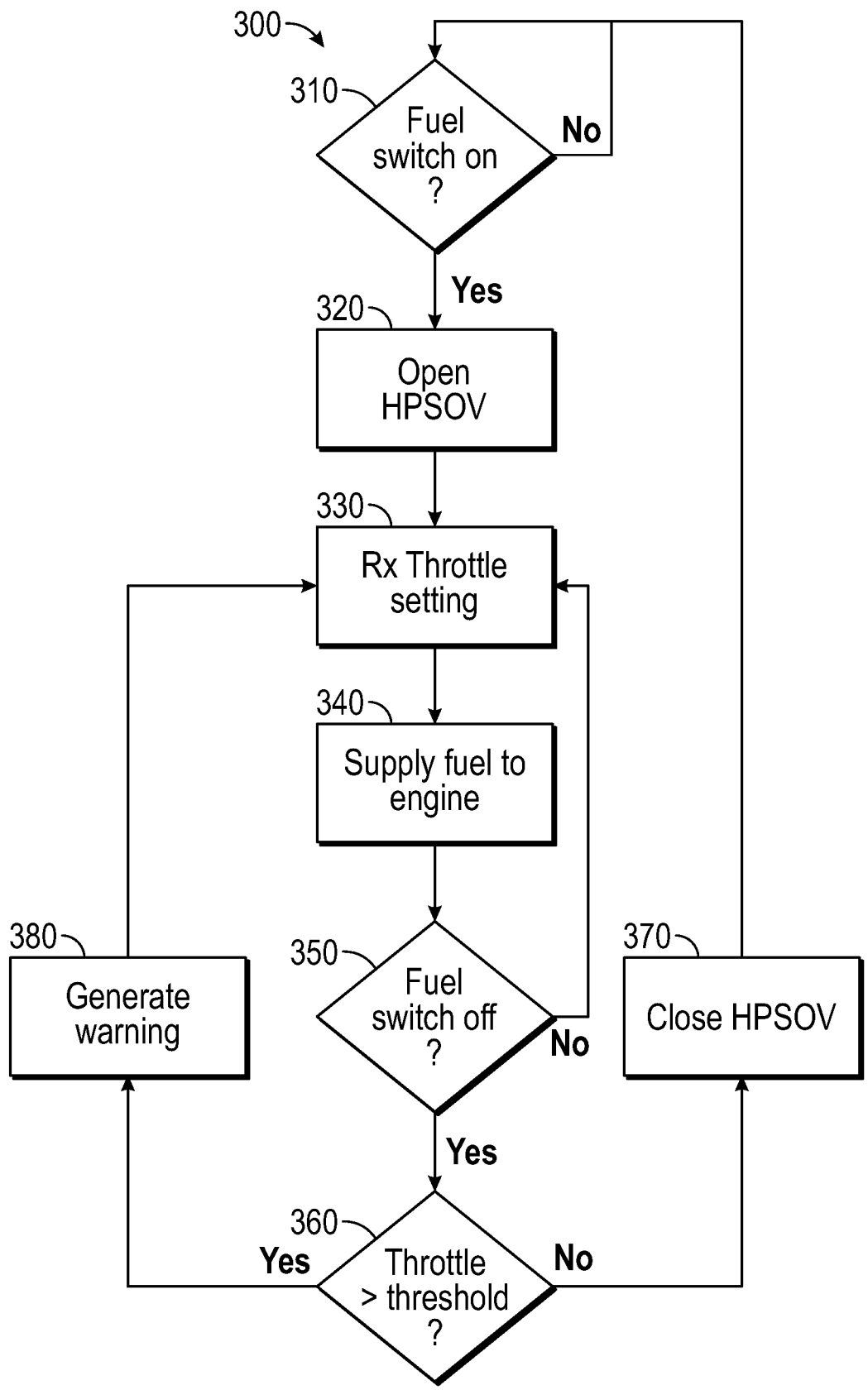
FIG. 3 shows a flow diagram illustrating a non-limiting embodiment of a method for prevention of unintended aircraft engine shutdown in accordance with the teachings of the present disclosure.

Turning now to FIG. 3, a flow diagram illustrating a non-limiting embodiment of a method 300 for prevention of unintended aircraft engine shutdown in accordance with the teachings of the present disclosure is shown. The method is first operative to determine 310 if a fuel switch had been switched to the "on" position. The fuel switch may be an "up and over" type toggle switch operative to close and/or open an electrical circuit to identify a switch position to a flight control processor, fuel system controller, fuel management unit or the like. If the fuel switch is not determined to be in the "on" position, the method is operative to return to determine at a later instant if the switch has been switched to the "on" position.

If the fuel switch is determined to be in the "on" position, the method is next operative for opening 320 the HPSOV. Opening the HPSOV allows high pressure fuel to be introduced into the turbine combustion chamber. Once the HPSOV is placed in the open position and assuming an operating engine, the method is next operative to receive 330 a throttle setting from the throttle or throttle controller. The throttle setting may be indicative of an angular deflection of a throttle lever positioned in a center console of an aircraft cockpit. The throttle position is used in controlling the flow rate of fuel to the turbine combustion chamber.

In response to determining the throttle position, the method is next operative to supply 340 fuel to the turbine engine proportional to the throttle position. In an exemplary embodiment, the fuel may originally be stored in a fuel tank located in a wing or fuselage of the aircraft. The fuel may first be extracted from the tank using a low-pressure fuel pump and provided to a fuel management unit or the like for metering the fuel according to the throttle position and other aircraft sensors. The fuel is then provided to a high-pressure fuel pump where it is supplied to the turbine engine.

While fuel is being provided to the turbine engine, the method is operative to monitor 350 the fuel switch position. If the fuel switch remains in the "on" position, the method is operative to continue to monitor 330 the throttle position, throttle setting, or throttle resolver angle, and to supply 340 fuel to the engine proportional to the throttle setting. If the fuel switch is switched to the off position, the method is next operative to determine 360 if the throttle position exceeds a throttle position threshold. In an exemplary embodiment, the throttle position threshold may be indicative of a throttle position for an operating turbine engine or a turbine engine operating under a heavy load, such as during climb, during heavy aircraft operations, and/or during low aircraft speed. In an exemplary embodiment, the throttle position threshold may be a positive throttle resolver angle of two degrees. Alternatively, the method may be operative to sense a turbine engine output power in response to a rotation sensor, fuel flow sensor, or the like. If the turbine engine output power exceeds a threshold amount, the method may assume that the throttle position is exceeding a threshold value.

If the method determines 360 that the throttle position does not exceed a threshold value, meaning that the engine is not operating at a power setting above idle, the method is operative to close 370 the HPSOV to stop fuel flow to the engine, thereby shutting down the engine. The method is then operative to return to monitoring 310 the fuel switch position. If the method determines 360 that the throttle position does exceed a threshold value, meaning that the engine is operating at a power setting above idle, the method is operative to generate 380 a warning to an aircraft occupant, such as the pilot, indicating that the engine was unintentionally attempted to be shut down while at a power setting above idle and that the engine operation must be retarded to idle before engine shutdown. If the throttle position does exceed a threshold value, the method is not operative to 370 close the HPSOV. In an exemplary embodiment, the aircraft operator would be required to reduce the throttle setting below the threshold value and then cycle the fuel cutoff switch from "off" to "on" and back to "off" to shut the HPSOV and shut down the engine. After the warning is provided to the aircraft operator, the method is operative to return to monitoring 330 the throttle setting and in an exemplary embodiment, the warning would remain until the fuel switch was returned to the "on" position.

Figure 4:
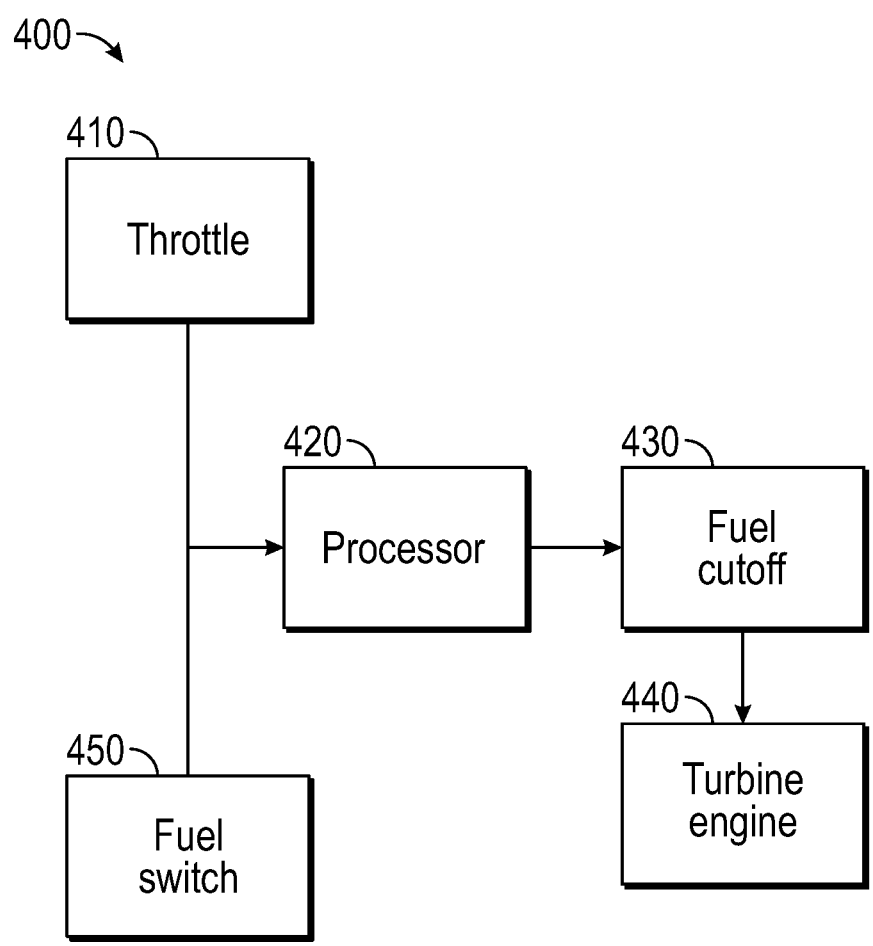
FIG. 4 is a simplified block diagram illustrating another non-limiting embodiment of a system for prevention of unintended aircraft engine shutdown in accordance with the present disclosure.

Turning now to FIG. 4, a block diagram illustrating a system 400 for prevention of unintended aircraft engine shutdown is shown. The exemplary system may include a throttle 410, a processor 420, a fuel switch 450, a fuel cutoff 430 and a combustion turbine engine 440.

In an exemplary embodiment the throttle 410 is operative to provide an operator input to control a fuel flow to the combustion turbine engine 440. The throttle 410 has a throttle position, such as a throttle resolver angle. The throttle may further include a throttle resolver for detecting a throttle lever angle and wherein the throttle position is determined in response to the throttle resolver angle.

The fuel switch 450 is operative to generate a control signal in order to control a state of the fuel cutoff 430. The fuel switch 450 may be an "up and over" type toggle switch having an on position and an off position. In an exemplary embodiment, the fuel switch 450 may be located in a center console of an aircraft control panel and may be located below the throttle control handles.

The fuel cutoff valve 430 may be a high-pressure cutoff valve 430 operative to cut off a fuel supply in response to a fuel cutoff control signal. The fuel cutoff valve 430 may be located between a high-pressure fuel pump and the combustion turbine engine 440. The combustion turbine engine 440 may have a fuel supply provided through the fuel cutoff valve 430 and having a fuel supply rate proportional to the throttle position.

In an exemplary embodiment, the processor 420 may be operative to generate the fuel cutoff control signal in response to the fuel switch 450 being in the off position and the throttle position not exceeding a throttle position threshold. In an exemplary embodiment, the throttle position threshold may be indicative of the combustion turbine engine at idle. In another exemplary embodiment, the throttle position threshold may be two degrees. The processor 420 may be further operative to generate a warning signal and not the fuel cutoff control signal in response to the throttle position exceeding the throttle position threshold and the fuel switch 450 being in the off position. In one exemplary embodiment, the warning signal may be indicative of the combustion turbine engine operating at a power level above idle. In another exemplary embodiment, the warning signal may be operative to illuminate a control panel warning light within an aircraft cockpit. In another exemplary embodiment, the warning signal may be operative to generate an audible alarm within an aircraft cockpit.

In another exemplary embodiment, the system 400 may be an aircraft including a a combustion turbine engine, a fuel tank, a fuel high pressure shutoff valve, a fuel pump for coupling a fuel supply from the fuel tank to the combustion turbine engine via the fuel high-pressure shutoff valve, a throttle controller having a throttle resolver angle proportional to an angular displacement of a throttle lever, a fuel switch for generating a first control signal indicative of the fuel switch being in an on position, and a processor configured to receive the first control signal and the throttle resolver angle and to generate a warning signal in response to the throttle resolver angle exceeding a threshold throttle angle, the processor being further operative to maintain the fuel supply to the combustion turbine engine in response to the first control signal and the throttle resolver angle exceeding the threshold throttle angle. The processor may be further operative to engage the fuel high-pressure shutoff value to halt the fuel supply to the combustion turbine engine in response to the first control signal and the threshold throttle angle exceeding the throttle resolver angle. In another exemplary embodiment, the warning signal includes a warning light on an aircraft control panel and an audible alarm presented to an aircraft operator within an aircraft cockpit.

Figure 5:
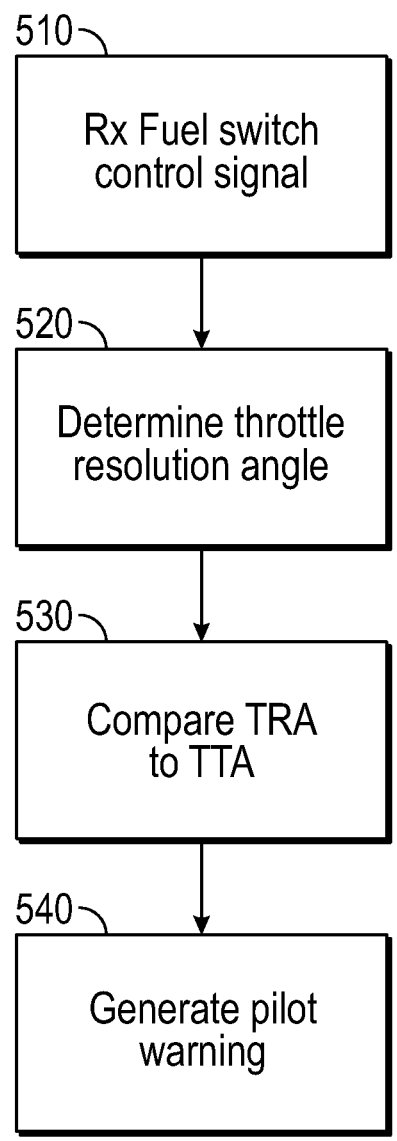
FIG. 5 shows a flow diagram illustrating another non-limiting embodiment of a method for prevention of unintended aircraft engine shutdown in accordance with the teachings of the present disclosure.

Turning now to FIG. 5, a flow diagram illustrating a non-limiting embodiment of a method 500 for prevention of unintended aircraft engine shutdown in accordance with the teachings of the present disclosure is shown. In this exemplary embodiment, the method is operative to supply fuel to a combustion turbine engine in an aircraft via a fuel high-pressure shutoff valve wherein the fuel high-pressure shutoff valve is controlled in response to the fuel switch. According to the exemplary embodiment, during the combustion turbine engine operation, the method is first operative for receiving 510, via a fuel switch, a first control signal indicative of an off position on a fuel switch.

The method is next operative for determining 520 a throttle resolver angle of a throttle controller in response to the first control signal. In an exemplary embodiment, the throttle resolver angle may be used to control a fuel flow to a combustion turbine engine in an aircraft. The method is next operative for comparing 530 the throttle resolver angle to a threshold throttle angle. In a first exemplary embodiment, the threshold throttle angle may be indicative of an idling aircraft engine. In a second exemplary embodiment, the threshold throttle angular may be a two-degree angle.

The method is next operative for generating 540 a pilot warning in response to the first control signal and the throttle resolver angle exceeding the threshold throttle angle. The pilot warning may include an aircraft panel warning light and/or an audible alarm in an aircraft cockpit. Alternatively, the method may be operative to maintain a fuel flow to a combustion turbine engine in response to the first control signal and the threshold throttle angle exceeding the throttle resolver angle.

In another exemplary embodiment, the method is further operative for generating a second control angle to close a fuel high pressure shutoff valve in response to the first control signal and the threshold throttle angle exceeding the throttle resolver angle. For example, the method may generate a second control angle to close a fuel high-pressure shutoff valve in response to a throttle control adjustment such that if the warning had been invoked, the threshold throttle angle is less than the throttle resolver angle, and the fuel switch being cycled from the off position to an on position and then again to the off position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft comprising:
    a throttle having a throttle position;
    a fuel switch having an on position and an off position;
    a fuel cutoff valve operative to cut off a fuel supply in response to a fuel cutoff control signal;
    a combustion turbine engine having a fuel supply provided through the fuel cutoff valve and having a fuel supply rate proportional to the throttle position; and
    a processor operative to generate the fuel cutoff control signal in response to the fuel switch being in the off position and the throttle position being less than a throttle position threshold, the processor being further operative to generate a warning signal in response to the throttle position exceeding the throttle position threshold and the fuel switch being in the off position.

2. The aircraft of claim 1, wherein the throttle position threshold is indicative of the combustion turbine engine at idle.

3. The aircraft of claim 1, wherein the fuel cutoff valve is a fuel high-pressure shut off valve.

4. The aircraft of claim 1, wherein the warning signal is indicative of the combustion turbine engine operating at a power level above idle.

5. The aircraft of claim 1, wherein the warning signal is operative to illuminate a control panel warning light within an aircraft cockpit.

6. The aircraft of claim 1, wherein the warning signal is operative to generate an audible alarm within an aircraft cockpit.

7. The aircraft of claim 1, further including a throttle resolver for detecting a throttle angle and wherein the throttle position is determined in response to the throttle resolver angle.

8. The aircraft of claim 1, wherein the throttle position threshold is two degrees.

9. A method comprising:
    receiving, via a fuel switch, a first control signal indicative of an off position on the fuel switch;
    determining, by a processor, a throttle setting of a throttle controller in response to the first control signal;
    comparing, by the processor, the throttle setting to a threshold throttle level;
    generating, by the processor, a second control signal to close a fuel high-pressure shutoff valve in response to the first control signal and the threshold throttle level exceeding the throttle setting; and
    generating, by a processor, a pilot warning in response to the first control signal and the throttle setting exceeding the threshold throttle level.

10. The method of claim 9 wherein the threshold throttle level is indicative of an idling aircraft engine.

11. The method of claim 9 wherein the pilot warning includes an aircraft panel warning light.

12. The method of claim 9 wherein the pilot warning includes an audible alarm in an aircraft cockpit.

13. The method of claim 9 wherein the throttle setting is used to control a fuel flow to a combustion turbine engine in an aircraft.

14. The method of claim 9 wherein the method is operative to maintain a fuel flow to a combustion turbine engine in response to the first control signal and the threshold throttle level exceeding the throttle setting.

15. The method of claim 9 further including generating a second control signal to close a fuel high-pressure shutoff valve in response to a throttle control adjustment such that the threshold throttle level exceeds the throttle setting and the fuel switch being cycled to an on position and then the off position.

16. The method of claim 9, further including supplying fuel to a combustion turbine engine in an aircraft via a fuel high-pressure shutoff valve wherein the fuel high-pressure shutoff valve is controlled in response to the fuel switch.

17. An aircraft, comprising:
a combustion turbine engine;
a fuel tank;
a fuel high-pressure shutoff valve;
a fuel pump for coupling a fuel supply from the fuel tank to the combustion turbine engine via the fuel high-pressure shutoff valve;
a throttle controller having a throttle resolution angle proportional to an angular displacement of a throttle handle;
a fuel switch for generating a first control signal indicative of the fuel switch being in an off position; and
a processor configured to receive the first control signal and the throttle resolution angle and to generate a warning signal in response to the throttle resolver angle exceeding a threshold throttle angle, the processor being further operative to maintain the fuel supply to the combustion turbine engine in response to the first control signal and the throttle resolver angle exceeding the threshold throttle angle.

18. The aircraft of claim 17 further wherein the processor is further operative to engage the fuel high-pressure shutoff valve to halt the fuel supply to the combustion turbine engine in response to the first control signal and the threshold throttle angle exceeding the throttle resolution angle.

19. The aircraft of claim 17 wherein the warning signal includes a warning light on an aircraft control panel and an audible alarm.

* * * * *